United States Patent
Makino et al.

(10) Patent No.: US 8,015,434 B2
(45) Date of Patent: Sep. 6, 2011

(54) MANAGEMENT APPARATUS, STORAGE SYSTEM, AND STORAGE APPARATUS MANAGEMENT METHOD

(75) Inventors: Tsukasa Makino, Kawasaki (JP); Tomoaki Tsuruta, Kawasaki (JP); Hiroaki Ochi, Kawasaki (JP); Marie Abe, Kawasaki (JP); Masanori Ito, Kawasaki (JP); Koji Ohtsuki, Kawasaki (JP); Atsushi Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 228 days.

(21) Appl. No.: 12/358,294

(22) Filed: Jan. 23, 2009

(65) Prior Publication Data

US 2009/0290249 A1 Nov. 26, 2009

(30) Foreign Application Priority Data

May 23, 2008 (JP) ................................ 2008-135283

(51) Int. Cl.
*G06F 11/00* (2006.01)
(52) U.S. Cl. .......................................... 714/6.1; 714/14
(58) Field of Classification Search ............ 714/5, 6–14, 714/42, 54, 710, 5.1, 5.11, 6.1, 6.11–6.13, 714/6.2, 6.21–6.24, 6.3, 6.31–6.32; 711/154, 711/152

See application file for complete search history.

(56) References Cited

U.S. PATENT DOCUMENTS

| | | | |
|---|---|---|---|
| 5,838,891 A | 11/1998 | Mizuno et al. | 395/182.03 |
| 2002/0038436 A1 | 3/2002 | Suzuki | 714/6 |
| 2002/0049887 A1* | 4/2002 | Takahashi | 711/115 |
| 2008/0177906 A1* | 7/2008 | Suzuki et al. | 710/14 |
| 2009/0063901 A1* | 3/2009 | Suzuki et al. | 714/25 |

FOREIGN PATENT DOCUMENTS

| | | |
|---|---|---|
| JP | 8-263225 | 10/1996 |
| JP | 11-85412 | 3/1999 |
| JP | 2002-108573 | 4/2002 |
| JP | 2003-162380 | 6/2003 |

\* cited by examiner

*Primary Examiner* — Dieu-Minh Le
(74) *Attorney, Agent, or Firm* — Staas & Halsey LLP

(57) ABSTRACT

There is provided a management apparatus of a storage apparatus. The management apparatus includes an acquisition determination section that determines whether predetermined identification information can be acquired or not from a mounting apparatus that mounts at least one storage apparatus and has at least one predetermined identification information assigned thereto, and a failure determination section that determines, based on a determination result of the acquisition determination section, an access failure to the storage apparatus mounted in the mounting apparatus has been caused due to a failure of the storage apparatus itself or an interruption of a power supply to the mounting apparatus.

16 Claims, 16 Drawing Sheets

Disk WHOSE ACCESS PATH HAS DISAPPEARED AT POWER FAILURE TIME IS NOT REGARDED AS FAILED Disk

FIG. 11

| Module NAME | STATUS |
|---|---|
| CM | NORMAL |
| Disk 32A | NORMAL |
| Disk 32B | NORMAL |
| Disk 32C | NORMAL |
| : | |
| Disk 32N | NORMAL |
| : | |

| Module NAME | STATUS |
|---|---|
| CM | NORMAL |
| Disk 32A | NORMAL |
| Disk 32B | NORMAL |
| Disk 32C | NORMAL |
| : | |
| Disk 32N | NORMAL⇒ABNORMAL |
| : | |

⇐ WHEN Disk BECOMES ABNORMAL, STATUS IS UPDATED FROM NORMAL TO ABNORMAL

ACCESS FAILURE

Disk WHOSE ACCESS PATH HAS DISAPPEARED AT POWER FAILURE TIME

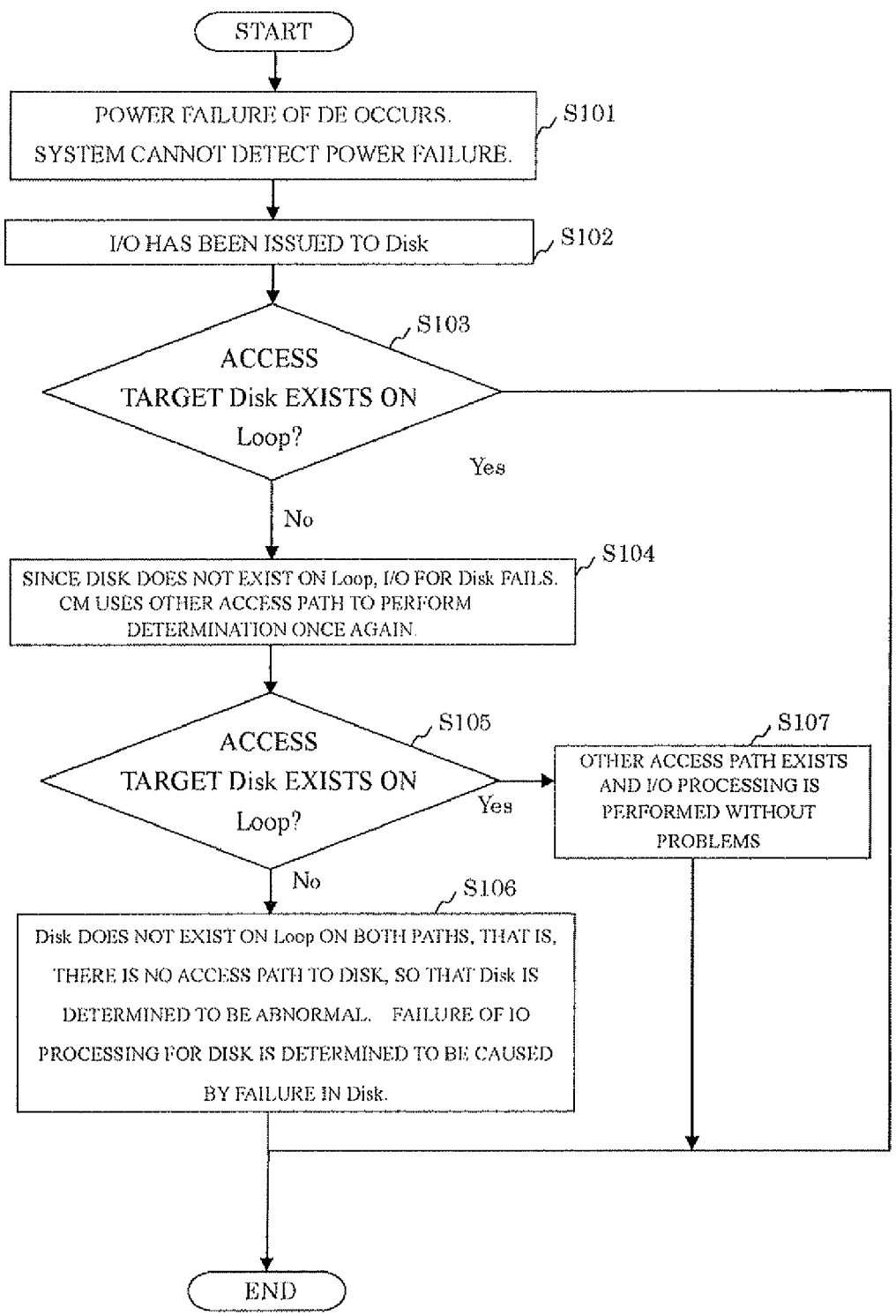

MANAGEMENT APPARATUS, STORAGE SYSTEM, AND STORAGE APPARATUS MANAGEMENT METHOD

CROSS-REFERENCE TO RELATED APPLICATIONS

This application is based upon and claims the benefit of priority of the prior Japanese Patent Application No. 2008-135283, filed on May 23, 2008, the entire contents of which are incorporated herein by reference.

FIELD

The present invention relates to a storage system capable of storing a large volume of data, a management apparatus for managing a storage apparatus, and a storage apparatus management method.

BACKGROUND

A storage system provided with a plurality of magnetic disk drives is now used for storing a huge volume of data.

FIG. 7 is a view schematically illustrating an entire configuration of a conventional storage system. A storage system 300 illustrated in FIG. 7 implements a RAID (Redundant Array Independent Disks) configuration for a magnetic disk drive to increase data redundancy so as to provide desirable performance characteristics to a host 200.

A description will be given of functions of respective modules constituting the storage system 300. A CA (Channel Adapter) 2 controls the interface with the host 200. Upon reception of data write/read operation request from the host 200, the CA 2 notifies a CM (Centralized Module) 400 of a processing request. The CA 2 directly accesses a cache memory on the CM 400 to perform data transfer between the storage system 300 and host 200.

The CM 400 serves as a core of all the modules constituting the storage system 300. The CM 400 performs resource management (manages the resources of each module and executes effective control management). Further, the CM 400 performs cache memory management (manages the allocation of the memory area in the CM 400 and executes general control). The CM 400 retains maintenance software and uses the maintenance software to provide various services. The CM 400 is provided with a DI (Device Interface) 11 which is a module for performing communication with a DE group 500 (details of which will be described later) composed of a plurality of magnetic disk drives. The DI 11 is connected to the DE group 500 by a fiber channel interface (hereinafter, fiber channel is abbreviated as "FC"). Through the DI 11, the CM 400 performs control of the FC interface communicating with the DE group 500, I/O control of the magnetic disk drive, control of RAID, and the like.

For redundancy, the storage system 300 has two CAs 2 and two CMs 400.

FIG. 8 is a view schematically illustrating a multi-initiator connection between the CMs 400 (DI 11) and magnetic disk drives. The DIs 11 and magnetic disk drives serving as initiators each are provided with an FC port. The respective FC ports are connected to one another to form an arbitrated loop.

Some of the terms used in the following description will be defined.

Arbitrated Loop (Hereinafter, Referred to Merely as "Loop")

The arbitrated loop is one of fiber channel topologies, in which a plurality of FC ports are connected in a loop so as to allow communication to be performed between a pair of the ports. The arbitrated loop supports up to 127 devices.

AL_PA and Loop ID

An address to be uniquely used in the arbitrated loop is assigned to each port in the loop. This address is referred to as AL_PA. The values of the AL_PA are not consecutive numbers and therefore the AL_PA is sometimes difficult to handle. For this reason, consecutive numbers are assigned to the respective AL_PA. Each of the consecutive numbers is referred to as Loop_ID. The value of the AL_PA can be fixed in a device in a hardware manner. However, in the case where the same value is assigned to the AL_PA by accident, AL_PA setting in a device nearer to a Loop Master is prioritized according to the priority set in the loop.

Loop Master

The Loop Master is a port that leads loop initialization, which is determined at the time of execution of loop initialization. If the loop includes a fabric port, the fabric port becomes the Loop Master. If the loop does not include a fabric port, a port having the smallest WWN (World Wide Name: world wide unique name) (in the present invention, WWPN (World Wide Port Name is referred to as WWN)) value in the loop is selected as the Loop Master.

Loop Initialization

The loop initialization is a necessary process for recognizing a device connected to the loop so as to make the device operational. The loop initialization is executed when a LIP (Loop Initialization Primitive) is issued from the Loop Master onto the loop.

Login

The Login is a procedure that exchanges information WWN, etc.) of a target port before data transfer so as to allow the port to be accessed.

Each FC port carries out the loop initialization when performing communication. The AL_PA (identification information) of each FC port is determined by the loop initialization. The setting of the AL_PA is made in the connection order of the devices starting from the Loop Master. A value to be set to the AL_PA can be specified in a hardware manner (hard assignment), and the specified value is directly set to the AL_PA in most cases. However, in the case where there exists an AL_PA with a hard assignment value on the loop, the specified AL_PA value is not set but the AL_PA value is set in a software manner (soft assignment) in the subsequent sequence in a predetermined order. The order (ascending order or descending order) of the soft assignment is determined based on a predetermined setting. It goes without saying that the same AL_PA value as that has been assigned to an FC port by hard assignment is not permitted.

The login procedure is executed after the loop initialization, and after the completion of the login procedure, communication with the magnetic disk drive becomes possible.

FIG. 9 is a view schematically illustrating a relationship between the DEs and magnetic disk drives. An apparatus in which the magnetic disk drive is mounted is called DE (Drive Enclosure). A plurality of magnetic disk drives can be mounted in one DE. The DE according to the present invention can be connected to the arbitrated loop and has a HUB function that allows the magnetic disk drive mounted therein to participate in the loop.

The DE can be connected to the loop by an FCC (Fiber Channel Controller) incorporated therein and can participate in the loop by the AL_PA assigned thereto. By using the DE to constitute a loop and by incorporating the magnetic disk drive in the DE connected to the loop, the magnetic disk drive can easily participate in the loop.

A configuration of the conventional DE group 500 will be described with reference to FIG. 10. The DE group 500 is constituted by a plurality of DEs 3. The DE 3 is provided with two FCCs 31 which are individually connected to respective magnetic disk drives (Disk 32A, Disk 32B, . . . , Disk 32N, which are sometimes collectively referred to as Disk 32), so that the two FCCs 31 can refer to the Disk 32 in the same way. With the above configuration, two access paths can be ensured with respect to the respective disk drives 32. For example, even if one of the two FCCs 31 malfunctions to affect one of the two loops in the DE 3, the CM 400 can access the Disk 32 using the other side loop. The FCC 31 in one DE 3 is cascade-connected to the FCC 31 in another FCC 31 and thereby the plurality of DEs 3 in the DE group 500 are connected to each other.

A configuration table retained in the CM 400 will be described with reference to FIG. 11. The configuration table is a list for storing information concerning the modules constituting the storage system 300 and represents a correspondence between the name of a module and status of the module. When given processing is executed in the storage system 300, the content of the configuration table is referred to.

FIG. 12 is a view schematically illustrating I/O processing of the storage system 300. The CM 400 checks the status of the magnetic disk drive (Disk 32N) to be accessed by referring to the configuration table before executing I/O processing. When confirming that the magnetic disk drive to be accessed is in normal status on the configuration table, the CM 400 executes the I/O processing for the magnetic disk drive.

The configuration table is updated every time the status of the module in the storage system 300 is changed. For example, as illustrated in FIG. 13, in the case where the magnetic disk drive becomes abnormal, the status thereof is updated from normal to abnormal.

Configuration table update processing will be described with reference to FIG. 14. For example, the magnetic disk drive becomes abnormal, the DI 11 notifies the CM 400 of module status change. The CM 400 receives the notification of the module status change and then updates the status of the module on the configuration table. Examples of cases where the module status is to be changed include a case where the CM 400 malfunctions, a case where the DE 3 is removed from a predetermined position in the storage system 300, a case where the magnetic disk drive has failed and cannot be used, a case where a new magnetic disk drive is added, and the like.

Although, in this manner, the CM 400 updates the configuration table when the module status is changed, there exists a time lag between the time at which the DI 11 detects the failure of the magnetic disk drive and the time at which the configuration table on the CM 400 is updated. During this time lag, the CM 400 cannot detect the failure of the magnetic disk drive. It follows that the CM 400 cannot inhibit issuance of I/O but issues I/O even if the magnetic disk drive has failed during the time lag.

A further description will be given of the time lag with reference to FIG. 15. Note that the DI 11 retains a different configuration table from that provided in the CM 400, which represents the statuses of the magnetic disk drives. FIG. 15 is a time chart illustrating operations of the host 200, CM 400, and DI 11 in the configuration table update processing based on the configuration tables retained in the CM 400 and DI 11. In FIG. 15, the statuses are differentiated by the width of an arrow, and the time flows downward.

In the initial state, all the Disk 32 are in normal status and there is no problem. In the case where the Disk 32N has failed at a given timing, the DI 11 detects the failure of the Disk 32N and updates the status of the Disk 32N on the configuration table retained therein from normal to abnormal.

Thereafter, the DI 11 notifies the CM 400 that the DI 11 has updated the configuration table retained therein. The CM 400 recognizes that the configuration table of the DI 11 has been updated by receiving the notification from the DI 11 and correspondingly updates the configuration table retained in the CM 400. The time lag occurs between the time at which the configuration table retained in the DI 11 is updated and the time at which the update of the configuration table is notified to the CM 400, and during this time lag, the CM 400 cannot detect the abnormality of the Disk 32N.

There is disclosed, as a conventional art, a disk array device capable of preventing any operation leading to the degeneration of the originally normal disk device. Further, there is disclosed a control method capable of preventing occurrence of a malfunction in an exchanged hard disk drive (HDD) device and detecting a connection miss of the HDD device when an HDD device is exchanged during the operation of a display array device.

Further, there is disclosed, as a conventional art, a data storage system capable of reducing a load of a data bus for connecting a host system and a data storage system. Further, there is disclosed a RAID device capable of preventing, even in the case where a failure which may induce a loop abnormality occurs in a RAID using disks with an FC interface, correcting the loop abnormality so as to prevent data loss.

Patent Document 1: Japanese Laid-Open Patent Publication No. 2002-108573
Patent Document 2: Japanese Laid-Open Patent Publication No. 11-85412
Patent Document 3: Japanese Laid-Open Patent Publication No. 8-263225
Patent Document 4: Japanese Laid-Open Patent Publication No. 2003-162380

When detecting that access to the magnetic disk drive cannot be made, the storage system 300 provided with conventional DEs 3 determines that the magnetic disk drive has failed and logically separates the relevant magnetic disk drive from the storage system 300. The access disabled state can be caused by a failure of the magnetic disk drive itself or by power failure of the DE 3.

When a power failure of the DE 3 occurs, the AL_PA of the magnetic disk drive provided in the DE 3 disappears from the loop and therefore the magnetic disk drive in the DE 3 becomes invisible to the CM 400. The CM 400 records information indicating that the magnetic disk drive in the DE 3 has become invisible to the CM 400 in the configuration table for update.

When the information indicating that the magnetic disk drive in the DE 3 has become invisible to the CM 400 exists on the configuration table of the CM 400, I/O is never executed. However, as described above, a time lag exists until the information of the magnetic disk drive that has become invisible is registered in the configuration table. Thus, a timing at which I/O is issued to the invisible magnetic disk drive may exist.

FIGS. 16A to 16C and FIGS. 17A to 17C are views illustrating conventional processing executed in the case where I/O is issued, during the time lag, to the magnetic disk drive (magnetic disk drive in the DE 3 in which a power failure has occurred) provided in the DE 3 which is in a disabled state due to occurrence of a power failure. In FIGS. 16A to 16C and FIGS. 17A to 17C, A and B each denote a loop. That is, the storage system 300 has two paths to the DE 3.

FIG. 16A illustrates a normal state, and FIG. 16B illustrates a state where a power failure has occurred in the DE 3.

When a power failure occurs in the DE 3, the AL_PA of the magnetic disk drive provided in the DE 3 and therefore the magnetic disk drive temporarily disappears (during the power failure) from the loop. The reason that the AL_PA disappears is that loop initialization is activated in the case where a power failure has occurred in the DE 3 and, in this case, the value of the AL_PA is not determined.

When an access request to the magnetic disk drive is generated in this state, the CM 400 tries to access the magnetic disk drive of the DE 3 in which a power failure has occurred through one path (in this case, path A), but the access fails (see FIG. 16C).

The CM 400 then tries to access the magnetic disk drive through the other path (in this case, path B), but the access fails (see FIG. 17A). The CM 400 recognizes that the access operation to the magnetic disk drive using all the access paths has failed and determines that the magnetic disk drive to be accessed has failed. At this timing, the CM 400 logically separates the magnetic disk drive from the storage system 300.

When a power supply is resumed to the DE 3, the DE 3 is recovered. At this time, the AL_PA of the magnetic disk drive provided in the DE 3 appears and, therefore, the magnetic disk drive has become visible on the loop (see FIG. 17B).

When the DE 3 is recovered after the resumption of power supply, the magnetic disk drive is accordingly recovered. However, the magnetic disk drive that was determined to be abnormal earlier is still separated from the storage system 300 as one in an access disabled state (see FIG. 17C). As described above, since the power failure of the DE 3 cannot be detected, the CM 400 has no choice but to determine that the disappearance of the magnetic disk drive in the DE 3 from the loop is caused by a failure of the magnetic disk drive even in the case where a power failure has actually occurred in the DE 3.

When it has been once determined that the magnetic disk drive has failed as described above, magnetic disk drive is still recognized as failed one even after the resumption of power supply. In order to recover the storage system 300 to a normal state afterward, it is necessary to replace the magnetic disk drive that has been determined to have failed although the magnetic disk drive is actually normal.

A further description will be given of the above processing with reference to the flowchart of FIG. 18.

A power failure of the DE 3 occurs and the AL_PA of the magnetic disk drive in the DE 3 in which the power failure has occurred disappears from the loop (step S101). The storage system 300 cannot detect the power failure.

In the case where an I/O access has been issued to the magnetic disk drive (step S102), the CM 400 uses a first access path to determine whether the AL_PA of the access target magnetic disk drive exists on the loop (step S103: first determination).

In the case where the AL_PA of the access target magnetic disk drive does not exist on the loop (No in step S103), the I/O processing for the magnetic disk drive fails. The CM 400 then uses a second access path to determine whether the AL_PA of the access target magnetic disk drive exists on the loop (step S104: second determination).

In the case where the existence of the AL_PA of the access target magnetic disk drive cannot be detected also in the second determination (No in step S105), which means the magnetic disk drive does not exist on the loop on both paths, so the CM 400 determines that an abnormality has occurred in the magnetic disk drive and updates the configuration table retained therein. It should be noted that the CM 400 updates the status of the magnetic disk drive on the configuration table from normal to abnormal and determines that the failure of the I/O processing for the magnetic disk drive is due to a failure in the magnetic disk drive.

In the case where the existence of the AL_PA of the access target magnetic disk drive can be detected in the first determination (Yes in step S103), which means that the access target magnetic disk drive is a magnetic disk drive unrelated to the power failure of the DE 3, so the I/O processing is performed without problems. Further, in the case where the existence of the AL_PA of the access target magnetic disk drive can be detected in the second determination (Yes in step S105), the CM 400 uses the second access path to perform the I/O processing for the magnetic disk drive without problems (step S107).

Considering the above, the following problems exist in the conventional storage system 300.

The storage system 300 cannot detect the power failure of the DE 3, so that when the power failure occurs in the DE 3, the storage system 300 recognizes as if the magnetic disk drive provided in the DE 3 suddenly disappeared from the loop and, as a result, determines that a failure has occurred in the magnetic disk drive.

Further, in the case where I/O processing is executed, during the time lag, for the magnetic disk drive in the DE 3 in which a power failure has occurred, the I/O processing fails. Further, since the magnetic disk drive does not exist on the loop, the CM 400 determines that any failure has occurred in the magnetic disk drive and separates the magnetic disk drive from the storage system 300. After the DE 3 is recovered from the power failure, the magnetic disk drive, which has not actually failed, appears on the loop. However, since the magnetic disk drive is determined to have failed at the time of occurrence of the power failure, it is not incorporated in the storage system 300, treated as a failed one, and forced to be replaced with a new one.

SUMMARY

According to an aspect of the present invention, there is provided a management apparatus of a storage apparatus, the management apparatus including an acquisition determination section that determines whether predetermined identification information can be acquired or not from a mounting apparatus that mounts at least one storage apparatus and has at least one predetermined identification information assigned thereto, and a failure determination section that determines, based on a determination result of the acquisition determination section, an access failure to the storage apparatus mounted in the mounting apparatus has been caused due to a failure of the storage apparatus itself or an interruption of a power supply to the mounting apparatus.

According to another aspect of the present invention, there is provided a storage system including a mounting apparatus that mounts at least one storage apparatus and has at least one predetermined identification information assigned thereto; an acquisition determination section that determines whether the predetermined identification information can be acquired or not from the mounting apparatus and a failure determination section that determines, based on a determination result of the acquisition determination section, an access failure to the storage apparatus mounted in the mounting apparatus has been caused due to a failure of the storage apparatus itself or an interruption of a power supply to the mounting apparatus.

According to another aspect of the present invention, there is provided a storage apparatus management method including determining whether predetermined identification information can be acquired or not from a mounting apparatus that mounts at least one storage apparatus and has at least one predetermined identification information assigned thereto; and determining, based on a result of the acquisition determination, an access failure to the storage apparatus mounted in the mounting apparatus has been caused due to a failure of the storage apparatus itself or an interruption of a power supply to the mounting apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a view illustrating a configuration table retained in a CM;

FIG. 18 is a flowchart illustrating processing executed in the conventional storage system.

DESCRIPTION OF EMBODIMENT(S)

Figure 1:
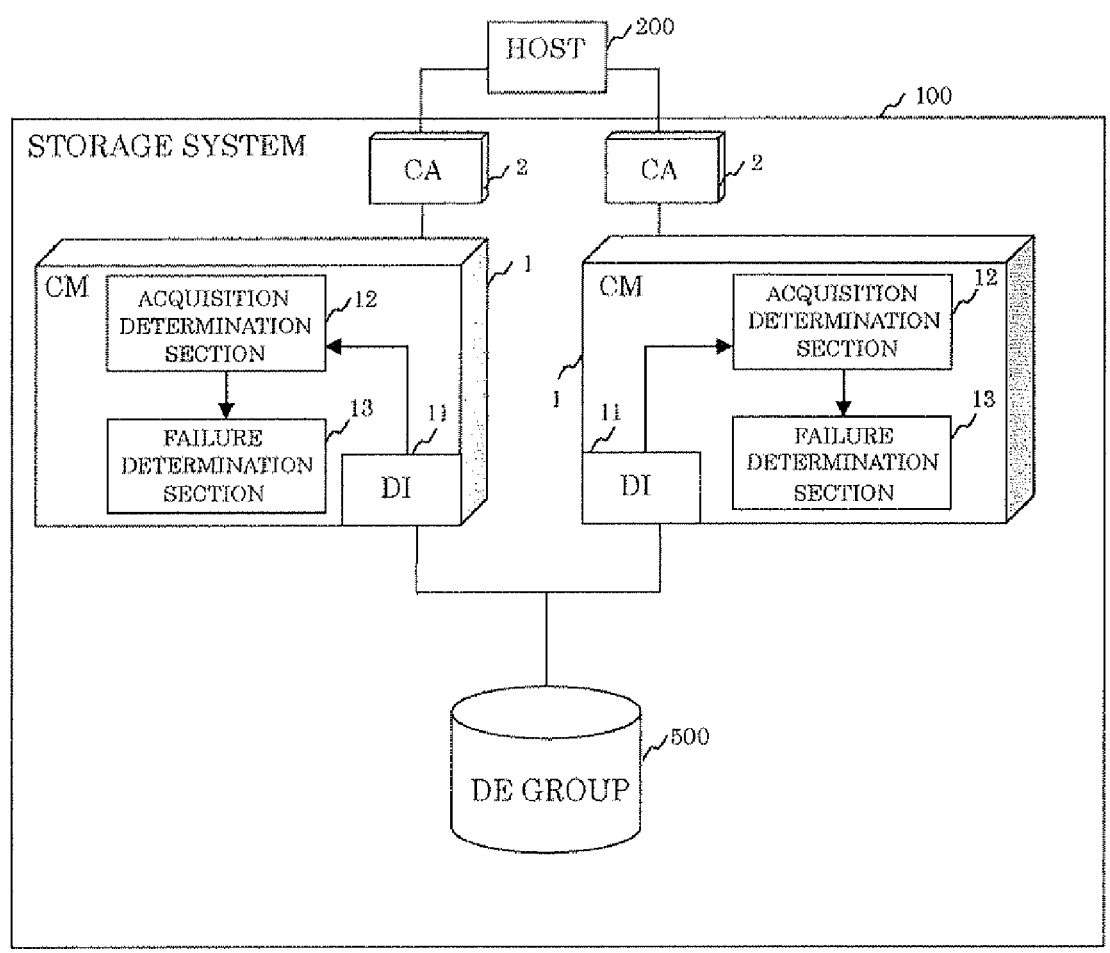
FIG. 1 is a block diagram illustrating an example of a configuration of a storage system according to an embodiment of the present invention.

FIG. 1 illustrates an example of a storage system according to an embodiment of the present invention.

Figure 7:
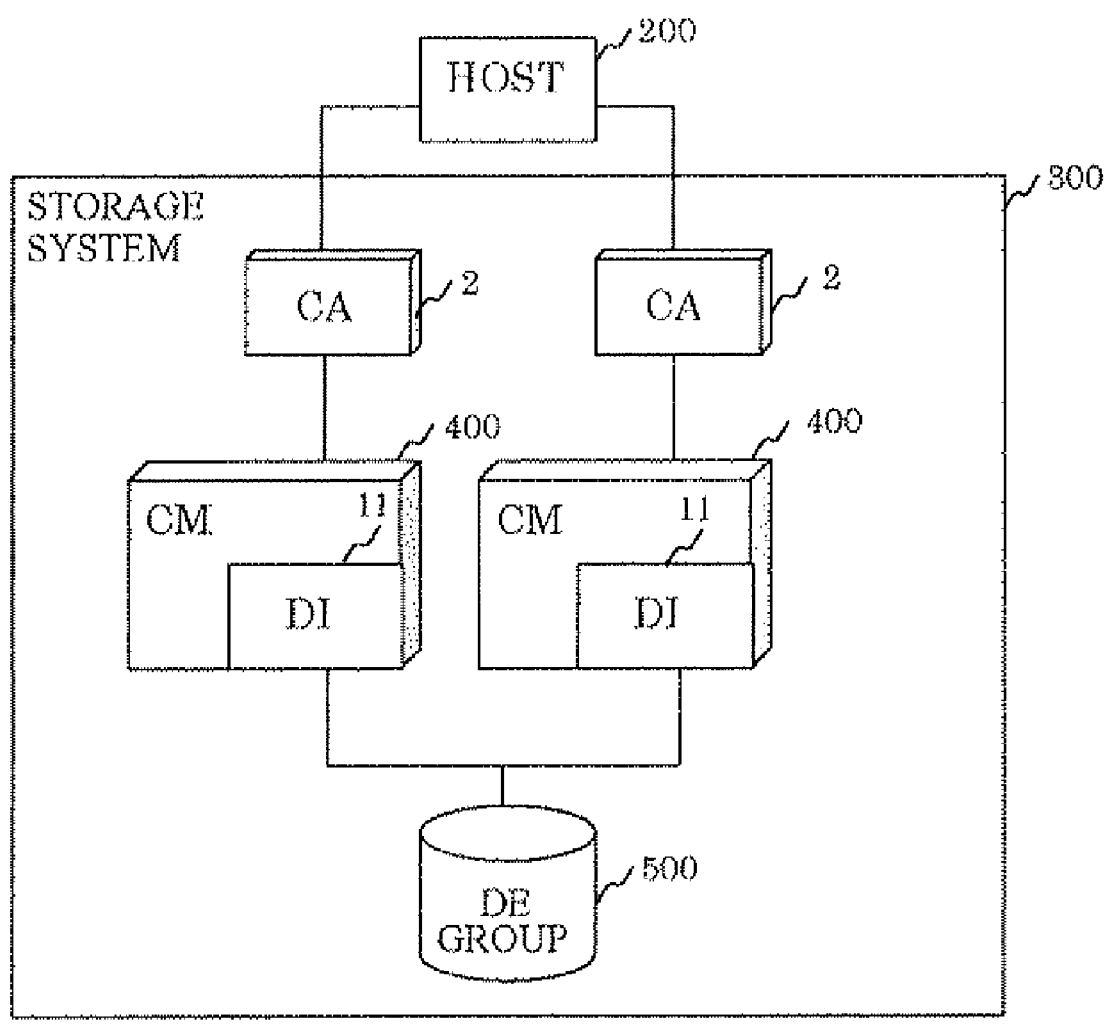
FIG. 7 is a view schematically illustrating a configuration of a conventional storage system.
Figure 8:
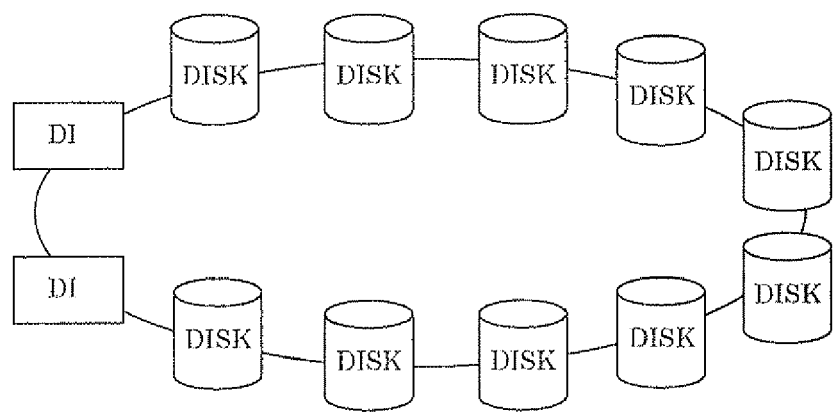
FIG. 8 is a view schematically illustrating a connection between DEs (DIs) and magnetic disk drives.
Figure 9:
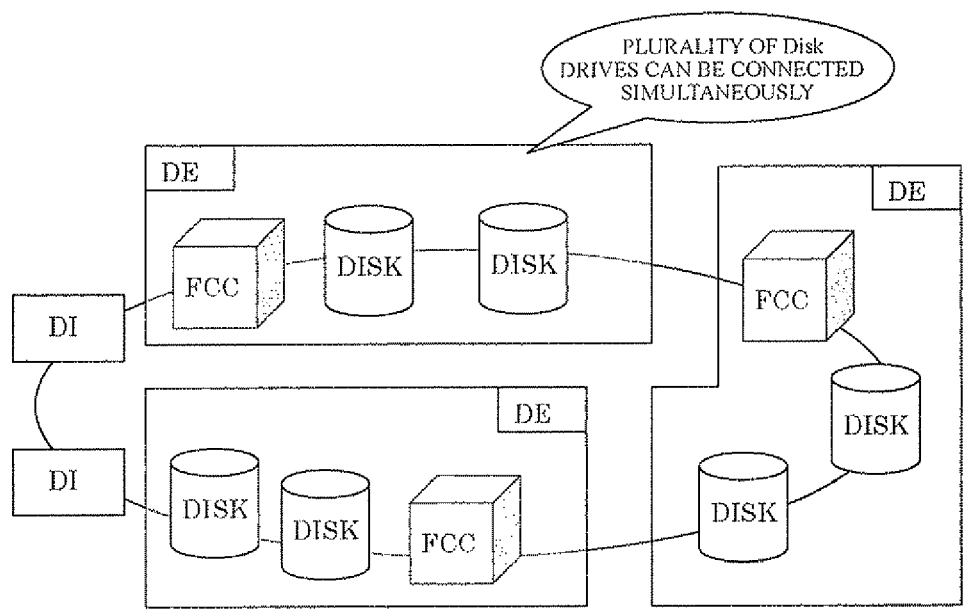
FIG. 9 is a view schematically illustrating a relationship between DEs and magnetic disk drives.
Figure 10:
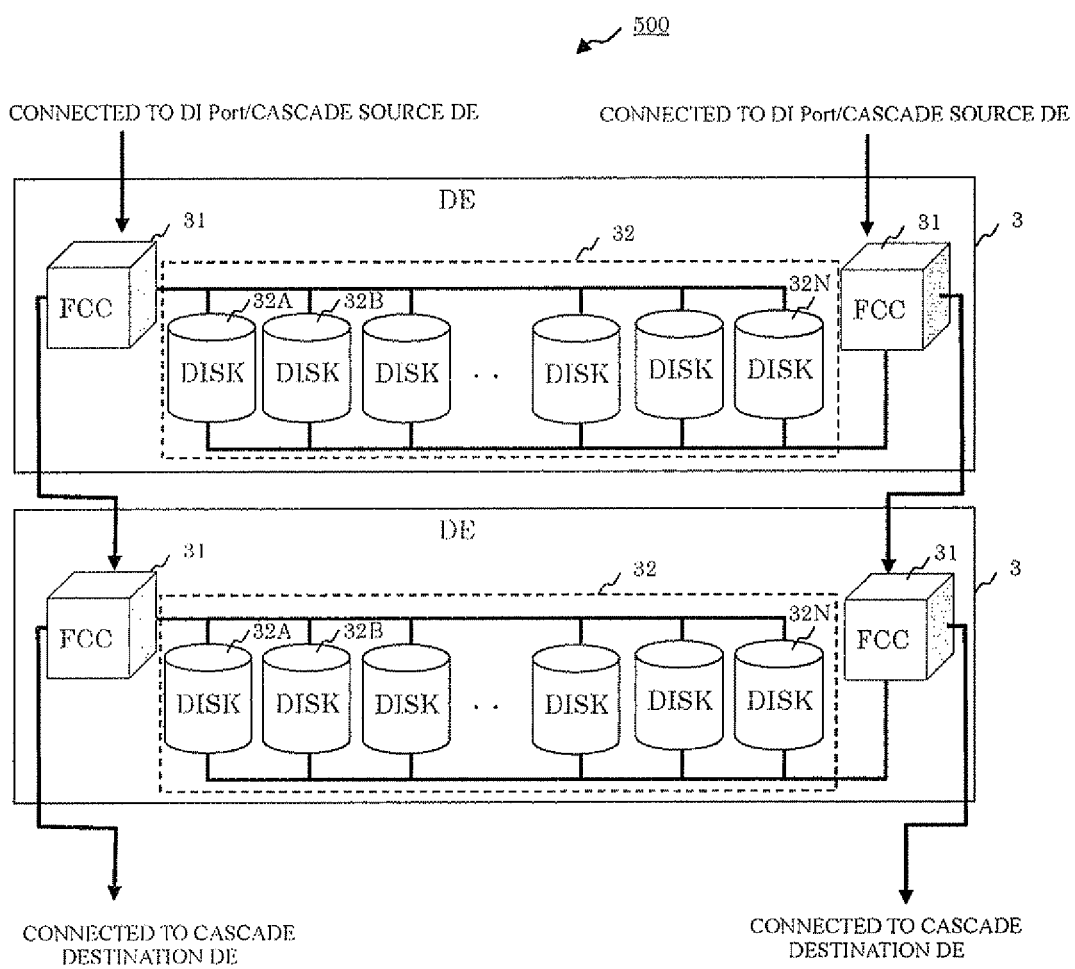
FIG. 10 is a block diagram illustrating an example of a configuration of a DE group.

A storage system 100 of FIG. 1 is provided with CAs 2, CMs 1, and a DE group 500. The CM 1 additionally includes an acquisition determination section 12 and a failure determination section 13 as compared to the conventional CM 400. The internal configurations of the CA 2 and DE group 500 are the same as those in the conventional storage system 300 and the descriptions thereof are omitted here (see configuration views of FIGS. 7 and 10).

The acquisition determination section 12 determines whether AL_PA (predetermined identification information) assigned to the DE 3 provided with at least one magnetic disk drive (storage apparatus) can be acquired or not. The AL_PA assigned to the DE 3 concretely means the AL_PA assigned to the FCC 31 provided in the DE 3.

The failure determination section 13 determines, based on a determination result of the acquisition determination section 12, whether an access disabled state of the magnetic disk drive provided in the DE 3 is caused by a failure of the magnetic disk drive itself or an interruption of power supply to the DE 3.

The functions of the acquisition determination section 12 and failure determination section 13 are realized by cooperation of software retained in a not illustrated non-volatile memory in the CM 1 and not illustrated hardware resources, such as a CPU or memory, provided in the CM 1.

The general operation of the present embodiment will be described below. In the case where the AL_PA of the magnetic disk apparatus does not exist on all the access paths although the loop is normal in a state where the storage system 100 issues an I/O instruction to the magnetic disk drive, the storage system 100 checks whether the DE 3 incorporating the magnetic disk drive exists on the storage system 100. In the present embodiment, confirmation of the existence of the DE 3 is made by determining whether the AL_PA assigned to the FCC 31 provided in the DE 3 exists on the loop.

In the case where the DE 3 has disappeared from the loop, the storage system 100 determines that the power failure of the DE 3 has caused the disappearance of the access paths to the magnetic disk drive and that the magnetic disk drive is normal. The reason that such determination can be made is as follows. That is, if the disappearance is caused due to a failure of the magnetic disk drive itself, it can be expected that only the AL_PA of the magnetic disk drive cannot be confirmed on the loop but the AL_PA of the FCC 31 can be confirmed. On the other hand, if the disappearance is caused due to the power failure of the DE 3, both the AL_PAs assigned to the magnetic disk drive and FCC 31 can disappear from the loop. As a result, in the case where both the AL_PAs of the magnetic disk drive and FCC 31 do not exist on the loop, it is possible to determine that the disappearance is caused due to the power failure.

In the case where an I/O instruction is issued from the host 200 to an invisible magnetic disk drive during the time lag associated with the update of the configuration table, there is no problem if the power failure can be detected during the I/O processing. Further, after the recovery of the power failure, the AL_PAs of the DE 3 and magnetic disk drive appear on the loop, resulting in the recovery of normal state before occurrence of the power failure. Thus, unlike the conventional storage system, it is possible to use the magnetic disk drive after the recovery of the DE 3 even if an access is made to the magnetic disk drive during the power failure.

The processing of the storage system 100 is illustrated in FIGS. 2A to 2C, 3A to 3C, and 4A and 4B.

Figure 2:
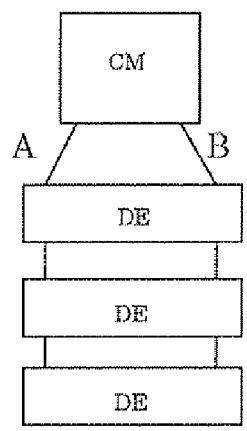
FIGS. 2A to 2C are views illustrating an example of processing executed in the storage system according to the present embodiment.
Figure 2:
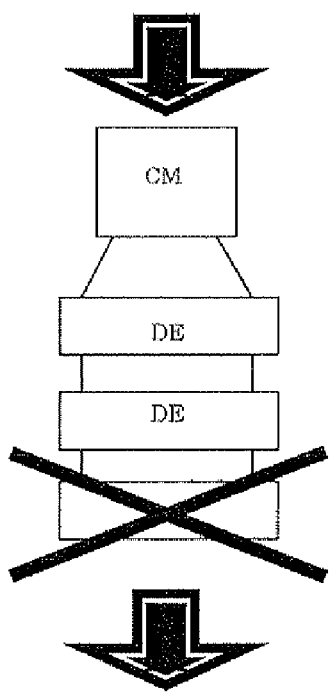
Figure 2:
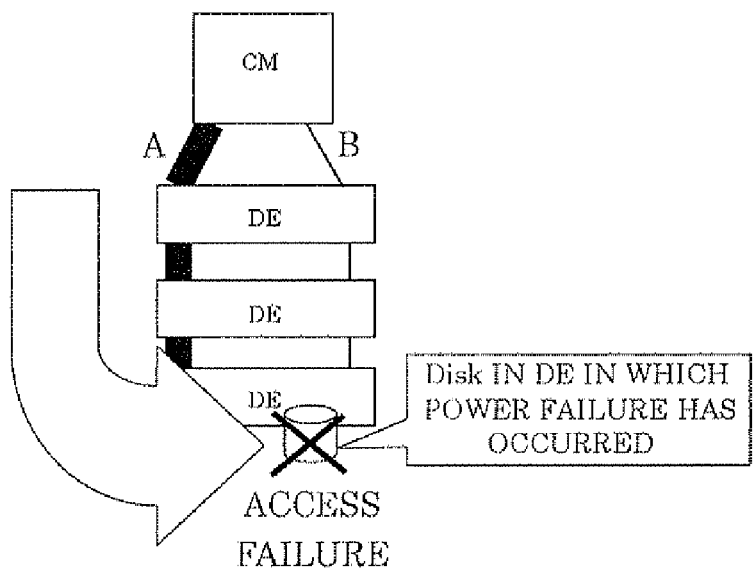
Figure 16:
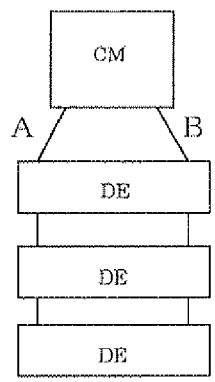
FIGS. 16A to 16C are views schematically illustrating processing executed in the case where a power failure has occurred in a conventional DE.
Figure 16:
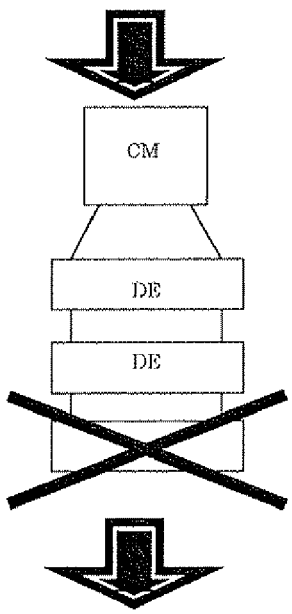
Figure 16:
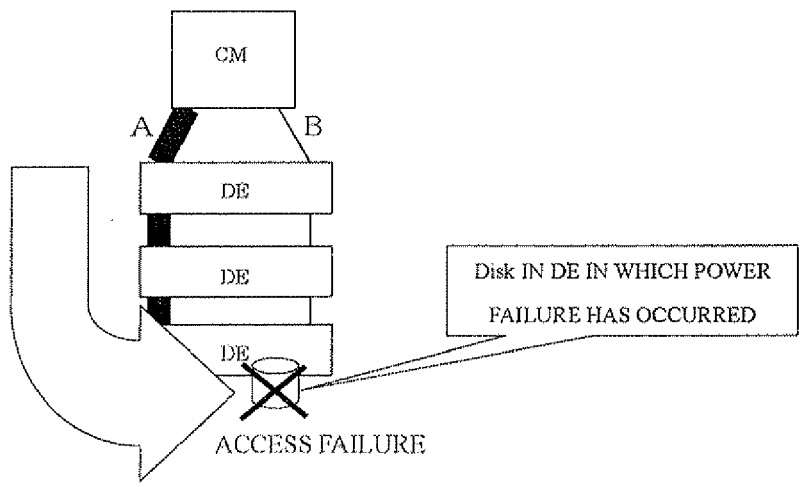
Figure 17:
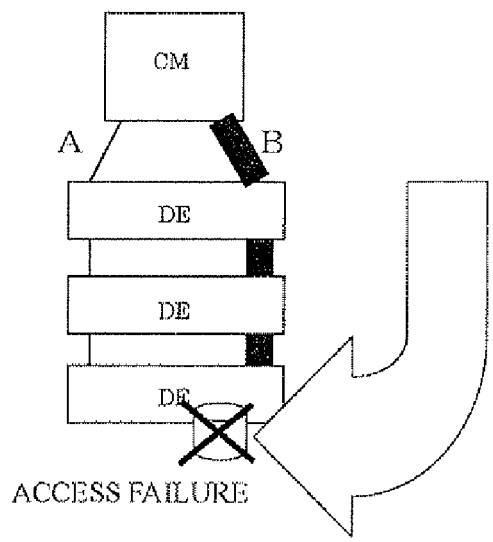
FIGS. 17A to 17C are views schematically illustrating processing executed in the case where a power failure has occurred in a conventional DE.
Figure 17:
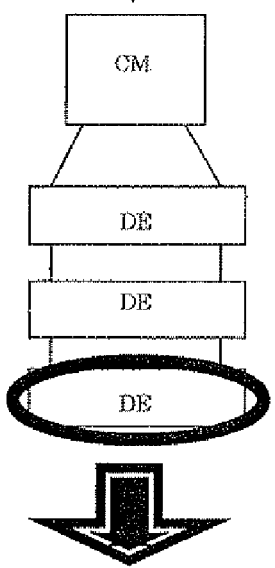
Figure 17:
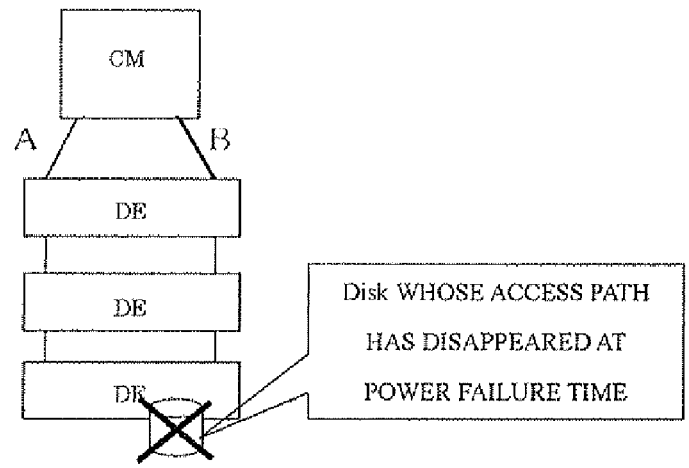

The series of processing from FIG. 2A to FIG. 2C are the same as those illustrated in FIG. 16A to FIG. 16C, and the descriptions thereof are omitted here.

Figure 3:
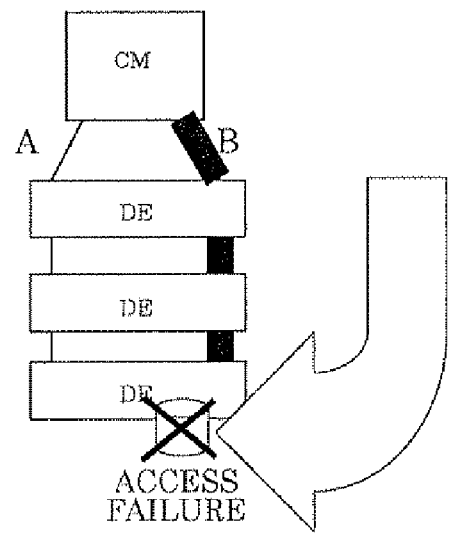
FIGS. 3A to 3C are views illustrating an example of processing executed in the storage system according to the present embodiment.
Figure 3:
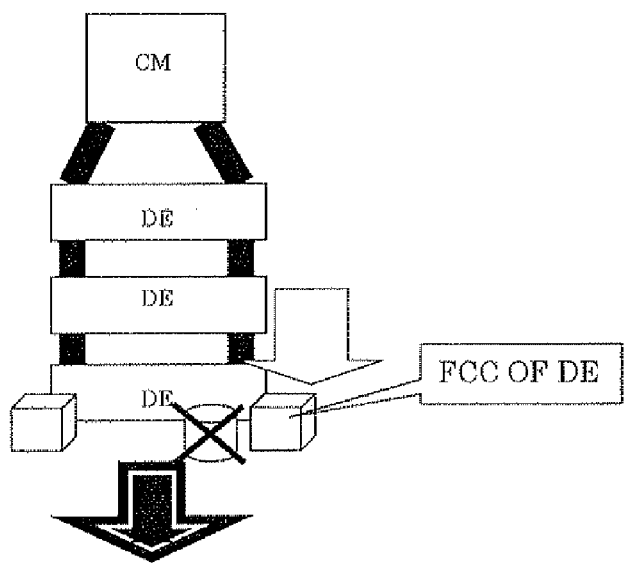
Figure 3:
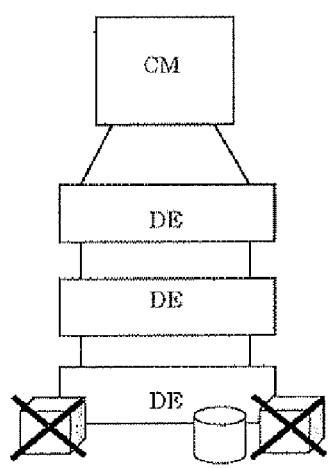
Figure 4:
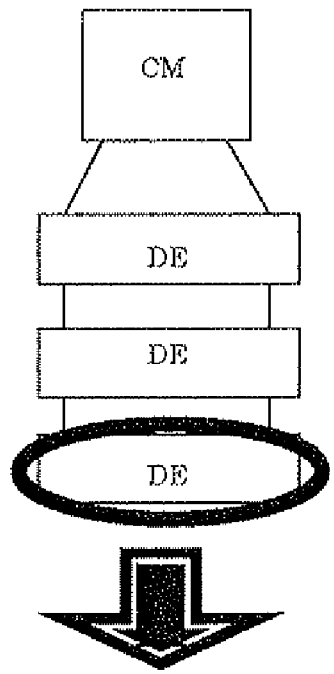
FIGS. 4A and 4B are views illustrating an example of processing executed in the storage system according to the present embodiment.
Figure 4:
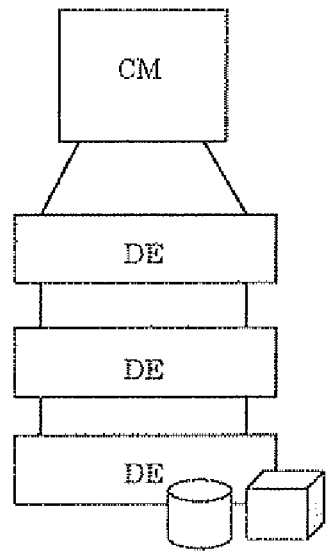

Although the CM 1 tries to access (access retry) the magnetic disk drive using a path (in this case, path B) different from a path through which an access has failed, this access also fails (see FIG. 3A). The failure determination section 13 recognizes that accesses to the magnetic disk drive through all the paths have failed and determines, at this stage, that the magnetic disk drive has failed.

After the accesses through both the paths (path A and path B) have failed by the processing up to FIG. 3A, the acquisition determination section 12 checks whether the FCC 31 of the DE 3 in which the magnetic disk drive to which the access is disabled is provided exists or not (see FIG. 3B). In this case, the acquisition determination section 12 confirms the existence of the FCC 31 by determining whether the AL_PA assigned to the FCC 31 can be acquired or not. When confirming that the FCC 31 does not exist, the failure determination section 13 cancels the determination of FIG. 3A, indicating that the magnetic disk drive has failed and newly determines that the access disable state is caused due to the power failure of the DE 3 (see FIG. 3C).

It should be noted that the acquisition determination section 12 performs the above confirmation of existence of the FCC 31 for all the access paths (in the present embodiment, path A and path B). This is because that when the confirmation is performed for only one path, it is impossible to determine whether the access disabled state is due to a failure of the FCC itself on the one path or due to a power failure of the DE 3.

When a power supply is resumed to the DE 3, the DE 3 is recovered. At this time, the AL_PA of the magnetic disk drive provided in the DE 3 appears and, therefore, the magnetic disk drive has become visible on the loop (see FIG. 4A). As described above, the magnetic disk drive to which an access has been made during the power failure appears on the loop. That is, even if an_access has been made to the magnetic disk drive during the power failure, the magnetic disk drive is not separated from the storage system 100 but can be used in the same way as before the occurrence of the power failure (see FIG. 4B).

Figure 5:
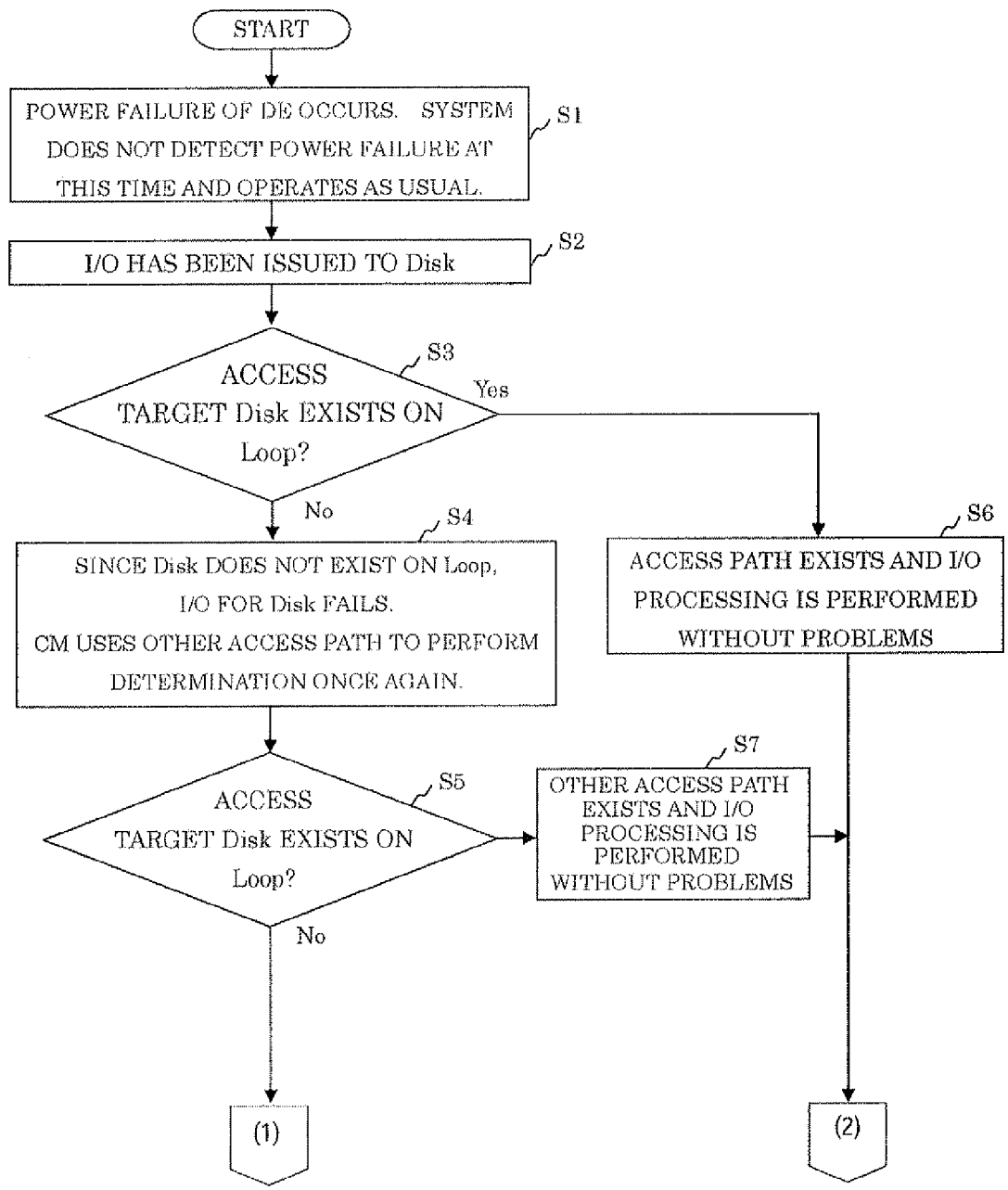
FIG. 5 is a flowchart illustrating an example of a processing procedure executed in the storage system according to the present embodiment.
Figure 6:
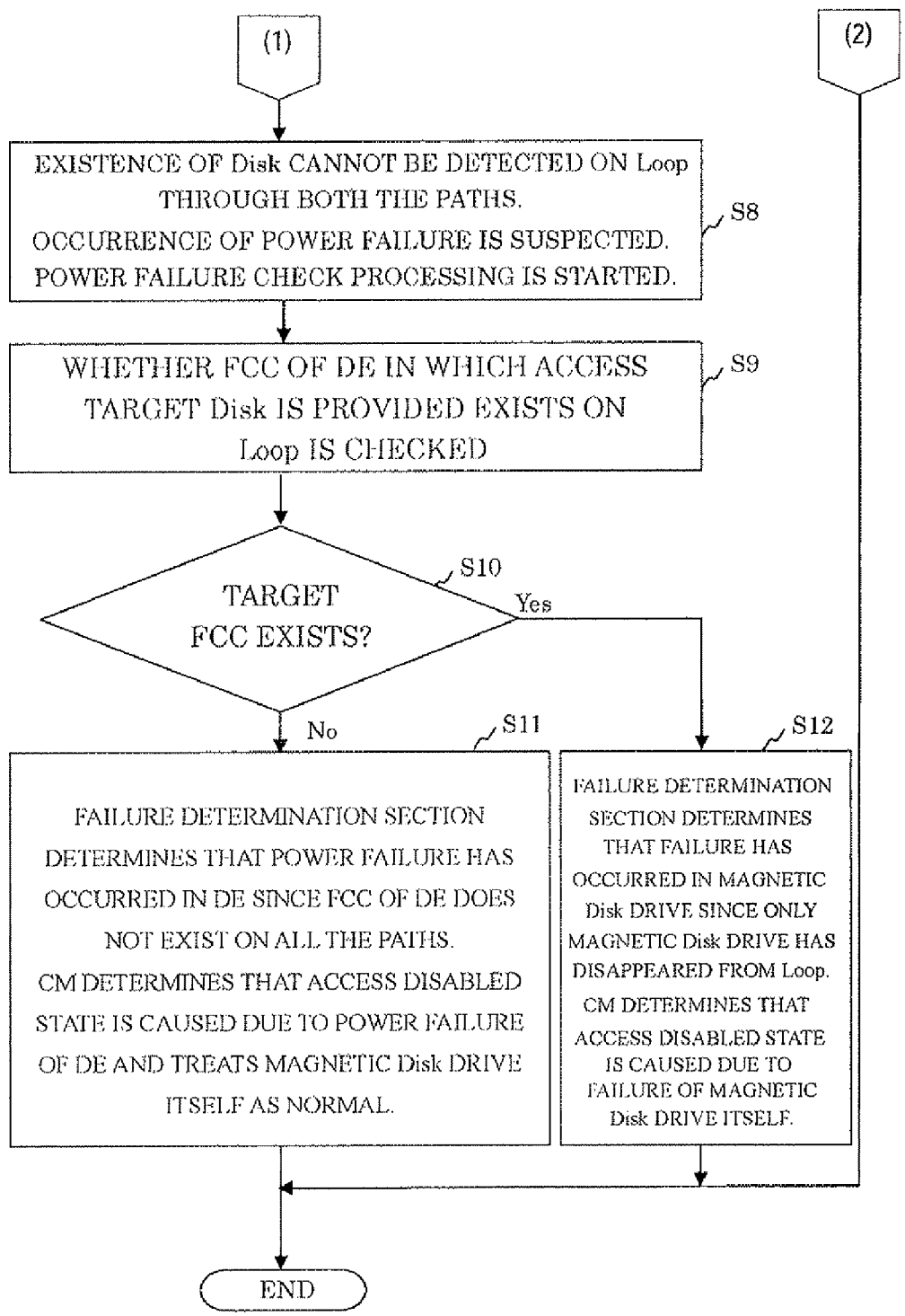
FIG. 6 is a flowchart illustrating an example of a processing procedure executed in the storage system according to the present embodiment.

A processing procedure executed in the storage system 100 according to the present embodiment will be described with reference to the flowcharts of FIGS. 5 and 6.

The processing from step S1 to step S5 (occurrence of the power failure of the DE 3 through one path (step S1), issuance of I/O to the magnetic disk drive (step S2), determination on whether the magnetic disk drive exists on the loop through the one path (step S3), issuance of I/O through the other path (step S4), determination on whether the magnetic disk drive exists on the loop through the other path (step S5)) are the same as the processing from step S101 to step S105 illustrated in FIG. 18, and the descriptions thereof are omitted here (see FIG. 18).

When the determination results in steps S3 and S5 reveal that existence of the magnetic disk drive cannot be detected through both the paths (No in step S5), which means that the occurrence of the power failure is suspected, so the power failure check processing for the DE 3 (performed by the acquisition determination section 12) is started (step S8).

Figures 12, 13:
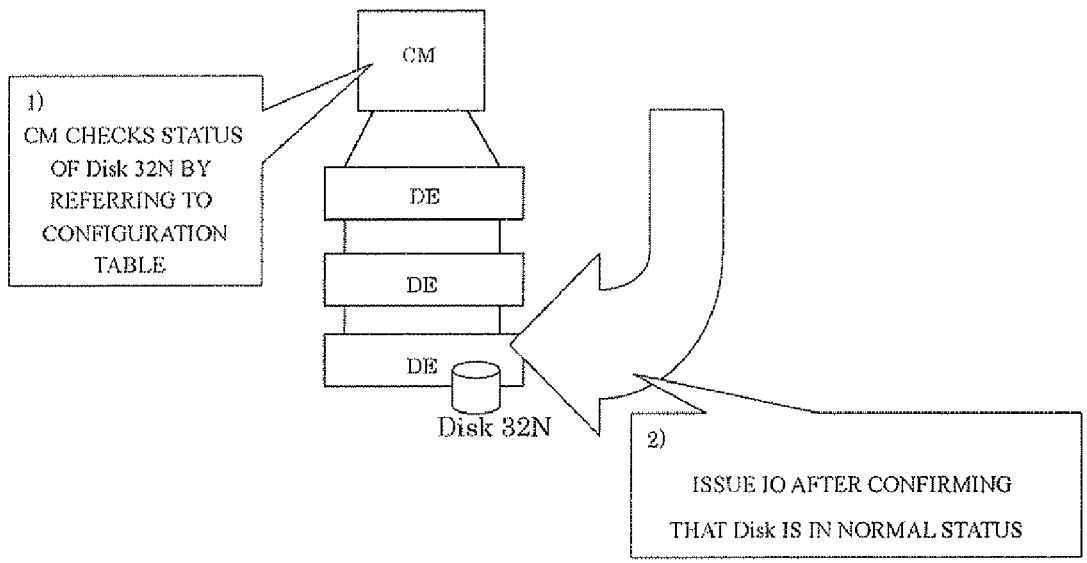
FIG. 12 is a view schematically illustrating I/O processing of the storage system.
FIG. 13 is a view illustrating update (from normal to abnormal) of the configuration table.
Figure 14:
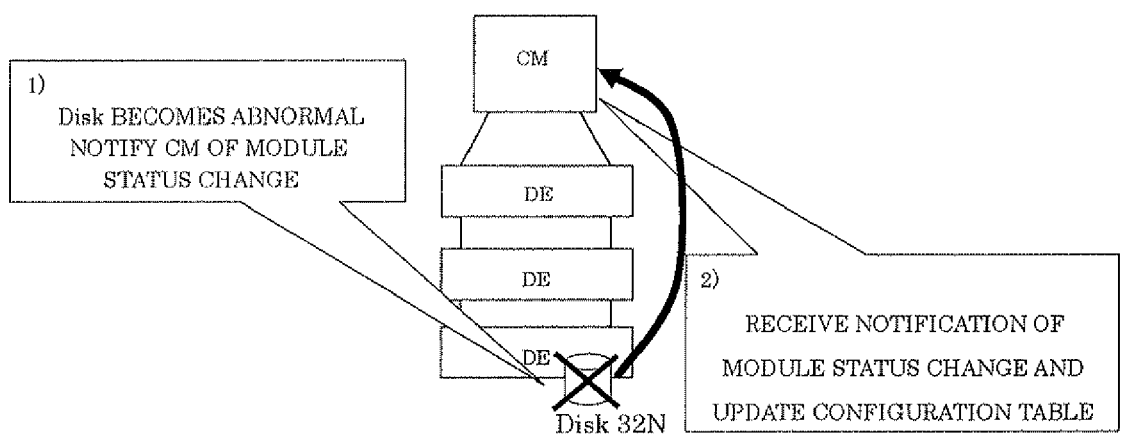
FIG. 14 is a view schematically illustrating configuration table update processing.
Figure 15:
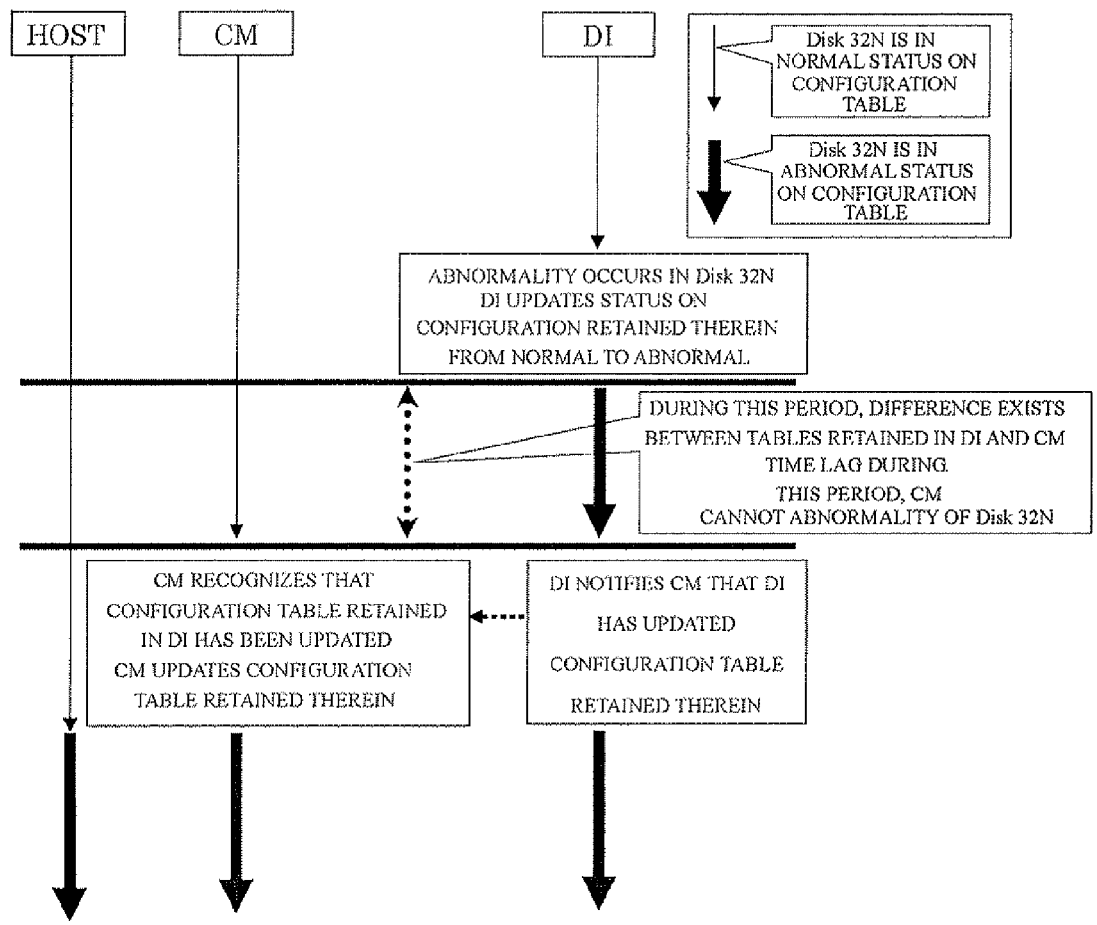
FIG. 15 is a view illustrating a time lag occurring in the configuration table update processing.

The acquisition determination section 12 checks whether the FCC 31 of the DE 3 in which the access target magnetic disk drive is provided exists on the loop by determining whether the AL_PA of the FCC 31 can be acquired or not (step S9). In the case where the AL_PA of the FCC 31 cannot be acquired and therefore the disappearance of the FCC 31 is confirmed (No in step S10), the failure determination section 13 determines that a power failure has occurred in the DE 3 since the FCC 31 of the DE 3 does not exist on the loop (step S11). At this time, the CM 1 determines that the access disabled state is caused due to the power failure of the DE 3 and treats the magnetic disk drive itself as normal. For example, the CM 1 updates the status of the magnetic disk drive on the configuration table (see FIGS. 11 and 13) provided therein to a status different from the abnormal status (for example, to a flag indicating a power failure status) and continues the I/O processing according to the power failure status.

On the other hand, in the case where the AL_PA of the FCC 31 can be acquired and therefore the existence of the FCC 31 is confirmed (Yes in step S10), the failure determination section 13 determines that a failure has occurred in the magnetic disk drive since only the magnetic disk drive has disappeared from the loop (step S12). At this time, the CM 1 determines that the access disabled state is caused due to the failure of the magnetic disk drive itself, updates the status of the magnetic disk drive on the configuration table (see FIGS. 11 and 13) provided therein to abnormal status, and continues the I/O processing according to the abnormal status of the magnetic disk drive.

In the case where a result of the processing of step S3 or step S5 is Yes, the I/O processing is normally performed (steps S6 or S7).

A mounting apparatus corresponding to the DE 3 including the FCC 31 in the present embodiment, identification information corresponds to the AL_PA in the present embodiment. Predetermined identification information corresponds to the AL_PA assigned to the FCC 31 in the present embodiment. A management apparatus corresponds to the CM 1 in the present embodiment. Access processing refers to a series of processing steps from the issuance of the I/O request to the magnetic disk drive by the host 200 to data read/write operation from/onto the magnetic disk drive (regardless of whether the read/write operation succeeds or fails).

By adopting the method according to the present embodiment, even a storage system provided with a DE that does not have a power failure detection function can detect the occurrence of a power failure and prevents a failure of the magnetic disk drive from being erroneously detected.

Further, by adopting the method according to the present embodiment, it is possible to detect the power failure of the DE during the I/O processing, thereby determining a cause of the disappearance of the AL_PA of the magnetic disk drive without waiting completion of update processing of apparatus configuration.

Whether an access failure to the storage apparatus is due to a failure of the storage apparatus itself or due to an interruption of a power supply to the mounting apparatus can be determined. Thus, it is possible to prevent a failure of the storage apparatus from being erroneously detected, thereby preventing unnecessary replacement of the storage apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A management apparatus of at least one storage apparatus, comprising:
a processor executing a process including:

determining whether the processor acquires predetermined identification information from a controller of a mounting apparatus, the predetermined identification information being assigned to the controller; and determining that an interruption of a power supply to the mounting apparatus causes a failure when the failure of an access to the storage apparatus mounted in the mounting apparatus occurs and the processor does not acquire the predetermined identification information from the controller.

2. The management apparatus according to claim 1, wherein the determining of whether the processor acquires the predetermined identification information is performed in response to the access to the storage apparatus.

3. The management apparatus according to claim 1, wherein the storage apparatus and the controller are connected to each other in an arbitrated loop topology.

4. The management apparatus according to claim 3, wherein identification information is assigned to the storage apparatus.

5. The management apparatus according to claim 4, comprising:

determining whether the processor acquires the identification information from the storage apparatus.

6. The management apparatus according to claim 1, wherein when the failure occurs, determining of whether the processor acquires the predetermined identification information is executed.

7. A storage system, comprising:

a mounting apparatus that mounts at least one storage apparatus;

a processor executing a process including:

determining whether the processor acquires predetermined identification information from a controller of the mounting apparatus, the predetermined identification information being assigned to the controller; and determining that an interruption of a power supply to the mounting apparatus causes a failure when the failure of an access to the storage apparatus mounted in the mounting apparatus occurs and the processor does not acquire the predetermined identification information from the controller.

8. The storage system according to claim 7, wherein the determining of whether the processor acquires the predetermined identification information is performed in response to the access to the storage apparatus.

9. The storage system according to claim 7, wherein the storage apparatus and the controller are connected to each other in an arbitrated loop topology.

10. The storage system according to claim 9, wherein identification information is assigned to the storage apparatus.

11. The storage system according to claim 10, comprising:

determining whether the processor acquires the identification information from the storage apparatus.

12. A method of managing at least one storage apparatus, comprising:

determining whether a processor acquires predetermined identification information from a controller of a mounting apparatus, the predetermined identification information being assigned to the controller; and determining that an interruption of a power supply to the mounting apparatus causes a failure occurs when the failure of an access to the storage apparatus mounted in the mounting apparatus occurs and the processor does not acquire the predetermined identification information from the controller.

13. The storage apparatus management method according to claim 12, wherein the determining of whether the processor acquires the predetermined identification information is performed in response to the access to the storage apparatus.

14. The storage apparatus management method according to claim 12, wherein the storage apparatus and the controller are connected to each other in an arbitrated loop topology.

15. The storage apparatus management method according to claim 14, wherein identification information is assigned to the storage apparatus.

16. The storage apparatus management method according to claim 15, wherein determining whether the processor acquires the identification information from the storage apparatus.

* * * * *